(12) United States Patent
Zeng

(10) Patent No.: US 10,979,098 B2
(45) Date of Patent: Apr. 13, 2021

(54) SPREAD-SPECTRUM DECODING METHOD FOR TRANSMITTED SIGNAL AND DISPLAY APPARATUS

(71) Applicants: HKC CORPORATION LIMITED, Shenzhen (CN); CHONGQING HKC OPTOELECTRONICS TECHNOLOGY CO., LTD., Chongqing (CN)

(72) Inventor: Dekang Zeng, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 70 days.

(21) Appl. No.: 16/471,128

(22) PCT Filed: Jul. 5, 2017

(86) PCT No.: PCT/CN2017/091886
§ 371 (c)(1),
(2) Date: Jun. 19, 2019

(87) PCT Pub. No.: WO2018/113254
PCT Pub. Date: Jun. 28, 2018

(65) Prior Publication Data
US 2020/0036410 A1      Jan. 30, 2020

(30) Foreign Application Priority Data
Dec. 22, 2016   (CN) .......................... 201611200806.0

(51) Int. Cl.
*H04B 1/7097*    (2011.01)
*H04B 1/7073*    (2011.01)

(52) U.S. Cl.
CPC ......... *H04B 1/7097* (2013.01); *H04B 1/7073* (2013.01); *H04B 2201/7073* (2013.01); *H04B 2201/709709* (2013.01)

(58) Field of Classification Search
CPC ............ G01S 19/24; G01S 1/02; G01S 19/37; H04W 4/80; H04B 1/7097; H04B 1/69;
(Continued)

(56) References Cited

U.S. PATENT DOCUMENTS

| 9,680,523 B1 * | 6/2017 | Gagnon | ................... H04B 1/69 |
| 2002/0071499 A1 * | 6/2002 | Kaewell | ................. H04B 1/711 |
| | | | 375/316 |

(Continued)

*Primary Examiner* — Freshteh N Aghdam
(74) *Attorney, Agent, or Firm* — Wang Law Firm, Inc.

(57) ABSTRACT

Disclosed are a spread-spectrum decoding method for a transmitted signal and a display apparatus. The method comprises: acquiring a fixed input frequency of an input signal, and taking the fixed input frequency as a decoding frequency; performing a calculation according to the fixed input frequency to obtain a cycle number N of the input signal within a pre-set time range; determining whether, during the pre-set time range, the ratio of the number of cycles corresponding to the input frequency after the spread-spectrum processing, which is greater than or less than the decoding frequency, to the cycle number N is greater than or equal to a pre-set percentage; if so, adding a one stage pre-set adjustment frequency value to the decoding frequency or subtracting same from the decoding frequency so as to obtain a new decoding frequency; and taking the new decoding frequency as an updated decoding frequency.

20 Claims, 12 Drawing Sheets

(58) Field of Classification Search
CPC .......... H04B 1/7073; H04B 2201/7073; H04B 2201/709709
See application file for complete search history.

(56) References Cited

U.S. PATENT DOCUMENTS

2010/0146373 A1* 6/2010 Chu ...................... H04L 1/0052
714/784
2018/0218692 A1* 8/2018 Zeng ........................ G09G 5/18

* cited by examiner

SPREAD-SPECTRUM DECODING METHOD FOR TRANSMITTED SIGNAL AND DISPLAY APPARATUS

CROSS-REFERENCES TO RELATED PATENT APPLICATION

This application is a National Stage Application of PCT International Patent Application No. PCT/CN2017/091886 filed on Jul. 5, 2017, under 35 U.S.C. § 371, which claims priority to and the benefit of Chinese Patent Application No. 201611200806.0, filed on Dec. 22, 2016, and the disclosure of which is incorporated herein in its entirety by reference.

FIELD OF INVENTION

The embodiment of the present application relates to the field of electronics, in particular to a spread-spectrum decoding method for transmitted signal and a display apparatus.

BACKGROUND OF INVENTION

1. Description of the Related Art

At present, any electronic component generating frequency signals is a potential electromagnetic interference (EMI) source, and such signals will affect the normal operation of an electronic product such as a radio, a television, or a mobile phone. More importantly, the energy reflection existed in high speed signals during a high speed signal transmission process may cause a very high level of EMI radiation energy which may affect or even harm human body.

Spread-spectrum technology is the most cost-effective solution to reduce EMI, and the spread-spectrum (SS) technology is a common wireless communication technology, wherein the fixed input frequency of high speed transmitted signals is modulated and demodulated according to a regular cycle. For example, the data signal of a thin film transistor liquid crystal display device (TFT-LCD) is generally a high speed transmitted signal, and the common ones include low voltage differential signaling (LVDS) transmitted signal, high resolution digital display interface (V-by-One) transmitted signal, high speed serial interface (mini-LVDS) transmitted signal and universal serial interface transmission (USIT) signal, etc. Although the spread-spectrum technology can overcome the problem of an overly-high EMI radiation energy, it also makes a time controller (TCON) to receive the high speed transmitted signal more difficult after a spread-spectrum demodulation, and has the risk of causing display noises due to a spread-spectrum decoding error of the transmitted signal.

2. Summary of the Invention

The spread-spectrum decoding method for transmitted signal and the display apparatus in accordance with the embodiments of the present application not only effectively reduces EMI radiation energy, but also receives the fixed input signal easily after the spread-spectrum demodulation while preventing display noises caused by spread-spectrum decoding errors.

To achieve the aforementioned objectives, in one aspect, the embodiment of the present application provides a spread-spectrum decoding method for transmitted signal, and the method comprises the following steps: acquiring a fixed input frequency of an input signal for performing a spread-spectrum processing, and using the fixed input frequency as a decoding frequency; calculating a number of cycles N of acquiring the input signal within a predetermined time range according to the fixed input frequency, wherein the number of cycles N is an integer greater than or equal to 1, and each cycle corresponds to an input frequency after a corresponding spread-spectrum, and the predetermined time range is smaller than half of the spread-spectrum demodulation cycle, and the spread-spectrum demodulation cycle is a cycle for performing the spread-spectrum processing of the input signal; determining whether or not a ratio of the quantity of cycles corresponsive to the input frequency greater than or smaller than the decoding frequency after a spread-spectrum within the predetermined time range to the number of cycles N is greater than or equal to a predetermined percentage; incrementing or decrementing the decoding frequency by a level of predetermined adjusted frequency value to obtain a new decoding frequency while the ratio of the quantity of cycles corresponsive to the input frequency greater than or smaller than the decoding frequency after a spread-spectrum within the predetermined time range to the number of cycles N is greater than or equal to the predetermined percentage; and using the new decoding frequency as an updated decoding frequency.

To achieve the aforementioned objectives, in the other aspect, the embodiment of the present application provides a display apparatus, comprising: a display panel; a storage unit configured for storing program instructions; and a processing unit, coupled to the display panel and the storage unit and configured for calling and executing the program instructions to perform the steps of: acquiring a fixed input frequency of an input signal for performing a spread-spectrum processing, and using the fixed input frequency as a decoding frequency; calculating a number of cycles N of acquiring the input signal within a predetermined time range according to the fixed input frequency, wherein the number of cycles N is an integer greater than or equal to 1, and each cycle corresponds to an input frequency after a corresponding spread-spectrum, and the predetermined time range is smaller than half of the spread-spectrum demodulation cycle, and the spread-spectrum demodulation cycle is a cycle for performing the spread-spectrum processing of the input signal; determining whether or not a ratio of the quantity of cycles corresponsive to the input frequency greater than or smaller than the decoding frequency after a spread-spectrum within the predetermined time range to the number of cycles N is greater than or equal to a predetermined percentage; and incrementing or decrementing the decoding frequency by a level of predetermined adjusted frequency value to obtain a new decoding frequency while the ratio of the quantity of cycles corresponsive to the input frequency greater than or smaller than the decoding frequency after a spread-spectrum within the predetermined time range to the number of cycles N is greater than or equal to a predetermined percentage.

To achieve the aforementioned objectives, in another aspect, the embodiment of the present application provides a display apparatus, comprising: a first acquisition unit configured for acquiring a fixed input frequency of an input signal performing a spread-spectrum processing, and using the fixed input frequency as a decoding frequency; a first calculation unit configured for calculating a number of cycles N of acquiring the input signal within a predetermined time range according to the fixed input frequency, wherein the number of cycles N is an integer greater than or equal to 1, and each cycle corresponds to an input frequency after a corresponding spread-spectrum, and the predetermined time range is smaller than half of the spread-spectrum demodulation cycle, and the spread-spectrum demodulation cycle is a cycle for performing the spread-spectrum processing of the input signal; a determination unit determining whether or not a ratio of the quantity of cycles corresponsive to the input frequency greater than or smaller than the decoding frequency after a spread-spectrum within the predetermined time range to the number of cycles N is greater than or equal to a predetermined percentage; an adjusting unit configured for incrementing or decrementing the decoding frequency by a level of predetermined adjusted frequency value to obtain a new decoding frequency while the ratio of the quantity of cycles corresponsive to the input frequency greater than or smaller than the decoding frequency after a spread-spectrum within the predetermined time range to the number of cycles N is greater than or equal to a predetermined percentage; and an update unit configured for updating the new decoding frequency as an updated decoding frequency.

The embodiment of the present application not only effectively reduces EMI radiation energy, but also receives the fixed input signal easily after the spread-spectrum demodulation while preventing display noises caused by spread-spectrum decoding errors, and achieves the effects of improving the accuracy of the spread-spectrum modulation and demodulation of the high speed transmitted signals, lowering the manufacturing cost, and enhancing the scope of applicability of the spread-spectrum technology.

DESCRIPTION OF THE PREFERRED EMBODIMENTS

The above and other objects, features and advantages of this disclosure will become apparent from the following detailed description taken with the accompanying drawings. Exemplary embodiments are illustrated in referenced figures of the drawings, and it is intended that the embodiments and figures disclosed herein are to be considered illustrative rather than restrictive.

It is noteworthy that the terms "comprise" and "include" used in this specification and claims of the invention refer to the existence of the described characteristic, whole, procedure, operation, element and/or component, but do not exclude the existence of one or more other characteristics, procedures, operations, elements, components, and/or their combinations. In addition, the terms used in the specification of the present application are provided for the purpose of illustrating the present application, but not intended for limiting the scope of the invention.

Figure 1:
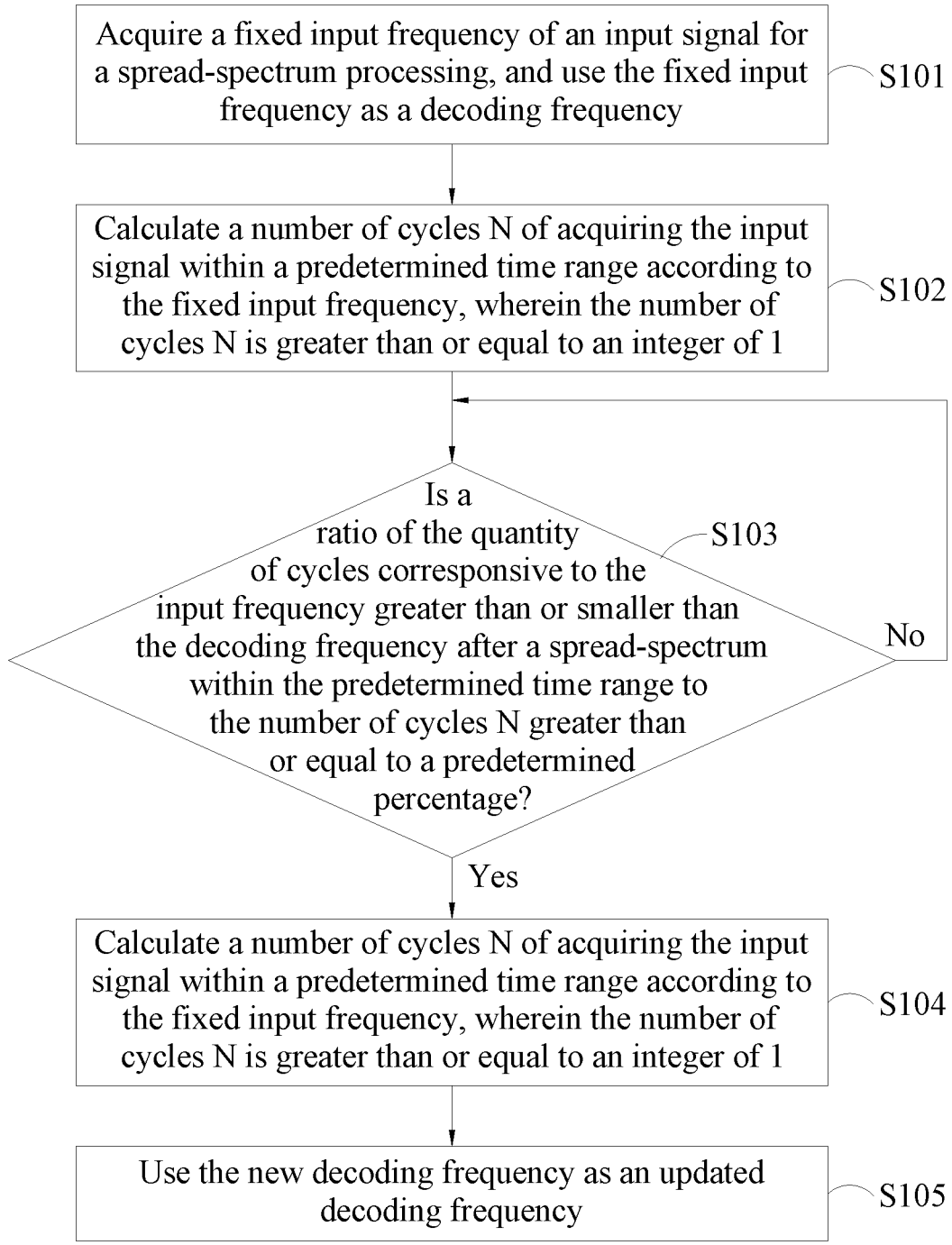
FIG. 1 is a flow chart of a spread-spectrum decoding method for transmitted signal in accordance with the embodiment of the present application.

With reference to FIG. 1 for a flow chart of a spread-spectrum decoding method for transmitted signal in accordance with an embodiment of the present application, the method comprises the following steps:

S101: Acquire a fixed input frequency of an input signal for a spread-spectrum processing, and use the fixed input frequency as a decoding frequency.

Wherein, the spread-spectrum function may be carried out to modulate and demodulate the fixed input frequency of the input signal with high speed transmission according to a regular cycle. For example, the low voltage differential signaling (LVDS) used in a TFT liquid crystal display device is generally a high speed transmitted signal. The fixed input frequency of the LVDS signal may be 75 MHz, and the spread-spectrum demodulation variation frequency may be 100 kHz. The larger the spread-spectrum demodulation variation frequency, the higher requirement of the spread-spectrum equipment. At present, the general spread-spectrum demodulation variation frequency has a range up to 200 Hz, or even higher. When the spread-spectrum demodulation variation frequency of the LVDS signal is 100 kHz, the allowable maximum floating range percentage of the fixed input frequency variation is ±2%. In other words, the input frequency varies within a range from 73.5 MHz to 76.5 MHz.

S102: Calculate a number of cycles N of acquiring the input signal within a predetermined time range according to the fixed input frequency, wherein the number of cycles N is an integer greater than or equal to 1, and each cycle corresponds to an input frequency after a corresponding spread-spectrum, and the predetermined time range is smaller than half of the spread-spectrum demodulation cycle, and the spread-spectrum demodulation cycle is a cycle for the spread-spectrum processing of the input signal.

Wherein, the cycle of the input signal may be calculated according to a fixed input frequency, so that the number of cycles N of obtaining the input signals within a predetermined time range can be found, and N is an integer greater than or equal to 1. For example, in FIG. 2a, the fixed input frequency of the LVDS signal is 75 MHz, and the spread-spectrum demodulation variation frequency is 100 kHz. Since the spread-spectrum demodulation cycle is the cycle for performing a spread-spectrum processing of the input signal, therefore the spread-spectrum demodulation cycle T is 100 μs. In FIG. 2b, N input signals of the cycle are included in the predetermined time range t1. In the meantime, the predetermined time range t1 is smaller than half of the spread-spectrum demodulation cycle T.

S103: Determine whether or not a ratio of the quantity of cycles corresponsive to the input frequency greater than or smaller than the decoding frequency after a spread-spectrum within the predetermined time range to the number of cycles N is greater than or equal to a predetermined percentage.

Wherein, the input signals received after the spread-spectrum in the predetermined time range t1 are of different cycles. If the ratio of the quantity of cycles corresponsive to the input frequency greater than or smaller than the decoding frequency after a spread-spectrum within the predetermined time range to the number of cycles N is greater than or equal to the predetermined percentage, most of the input signals received after the spread-spectrum will be too large. As long as the decoding frequency is increased, the spread-spectrum decoding will be more accurate, and the display noise can be reduced. Similarly, if the ratio of the quantity of cycles corresponsive to the input frequency greater than or smaller than the decoding frequency after a spread-spectrum within the predetermined time range to the number of cycles N is greater than or equal to the predetermined percentage, most of the input signals received after the spread-spectrum will be too small. As long as the decoding frequency is decreased, the spread-spectrum decoding will be more accurate, and the display noise can be reduced. Therefore, it is necessary to compare the decoding frequency with the input frequency received after the spread-spectrum, and further determine the comparison result. Optionally, the predetermined percentage is greater than 50%.

S104: Increment or decrement the decoding frequency by a level of a predetermined adjusted frequency value to obtain a new decoding frequency, if the ratio of the quantity of cycles corresponsive to the input frequency greater than or smaller than the decoding frequency after a spread-spectrum within the predetermined time range to the number of cycles N is greater than or equal to a predetermined percentage.

Wherein, if the ratio of the quantity of cycles corresponsive to the input frequency greater than or smaller than the decoding frequency after a spread-spectrum within the predetermined time range to the number of cycles N is greater than or equal to a predetermined percentage, then the decoding frequency will be incremented by a level of predetermined adjusted frequency value to obtain a new decoding frequency. Wherein, each predetermined time range t1 corresponds to a predetermined adjusted frequency value, and the predetermined adjusted frequency value of each level is set according to the actual situation.

Figure 2A:
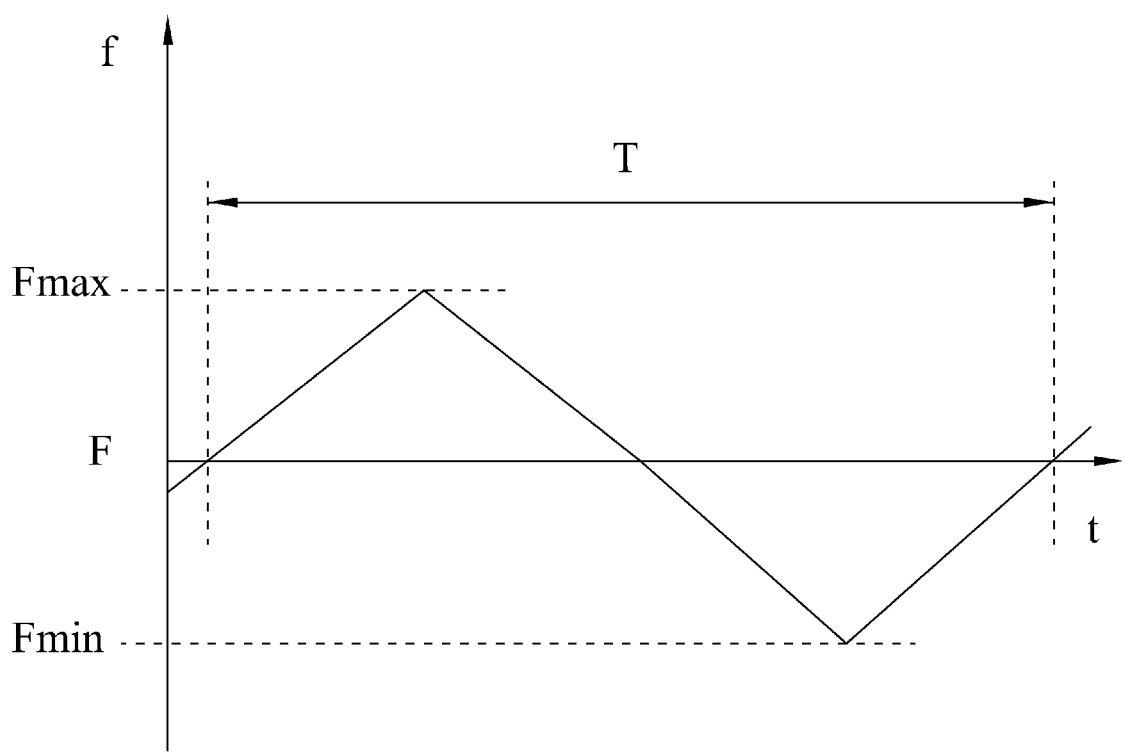
FIG. 2a is a spread-spectrum waveform chart of the embodiment of the present application.
Figure 2B:
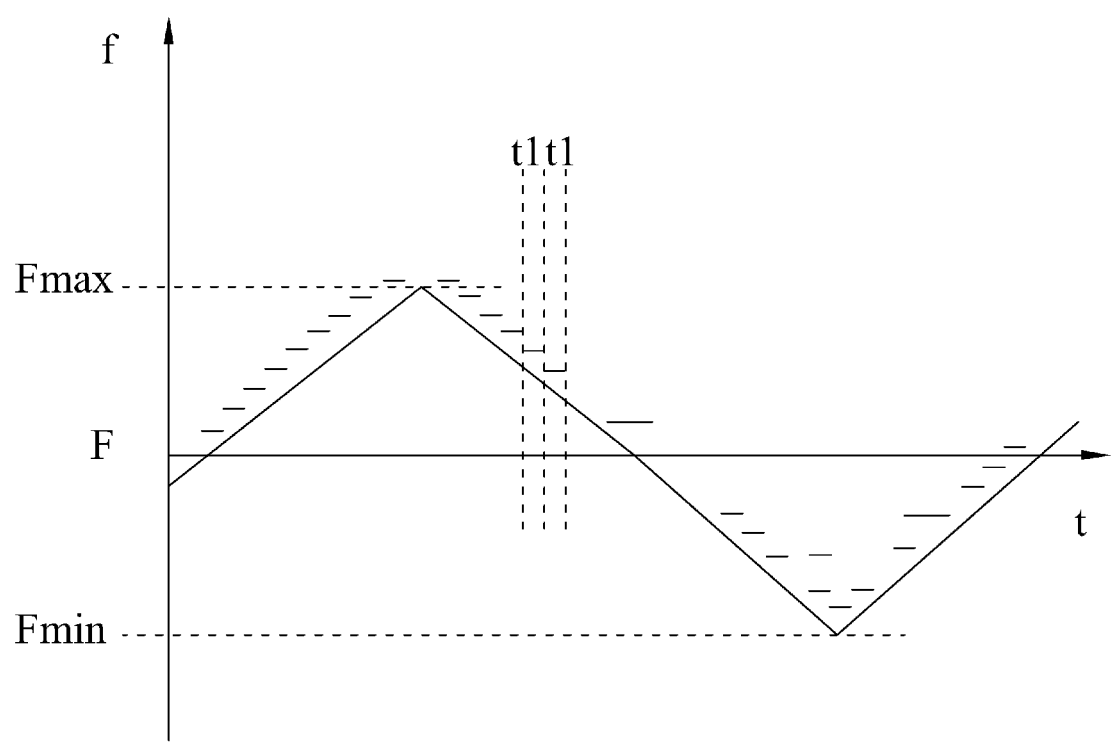
FIG. 2b is another spread-spectrum waveform chart of the embodiment of the present application.

Specifically, for example, in FIGS. 2a and 2b, when the fixed input frequency of the LVDS signal is 75 MHz, the predetermined time range t1 is 500 ns, and the cycle of the LVDS signal is approximately 13.3 ns, the predetermined time range t1 includes 37.6 cycles which is approximately equal to 40 cycles, which leads to N equals to 40. If the predetermined percentage is 60%, only the input frequency with 24 or more cycles received after the spread-spectrum is greater than the decoding frequency, then the decoding frequency will be incremented by a level of predetermined adjusted frequency value to obtain a new decoding frequency. Similarly, if only the input frequency with 24 or more cycles received after the spread-spectrum is smaller than the decoding frequency, then the decoding frequency will be decremented by a level of predetermined adjusted frequency value to obtain a new decoding frequency.

S105: Use the new decoding frequency as an updated decoding frequency.

Wherein, after the new decoding frequency is obtained, it is necessary to update the original decoding frequency. The obtained new decoding frequency is the updated decoding frequency and provided for continuing the spread-spectrum decoding that follows, so as to perform the spread-spectrum decoding of the received input signals by the same method, ensure the display effect, and prevent the display noise.

Figure 3:
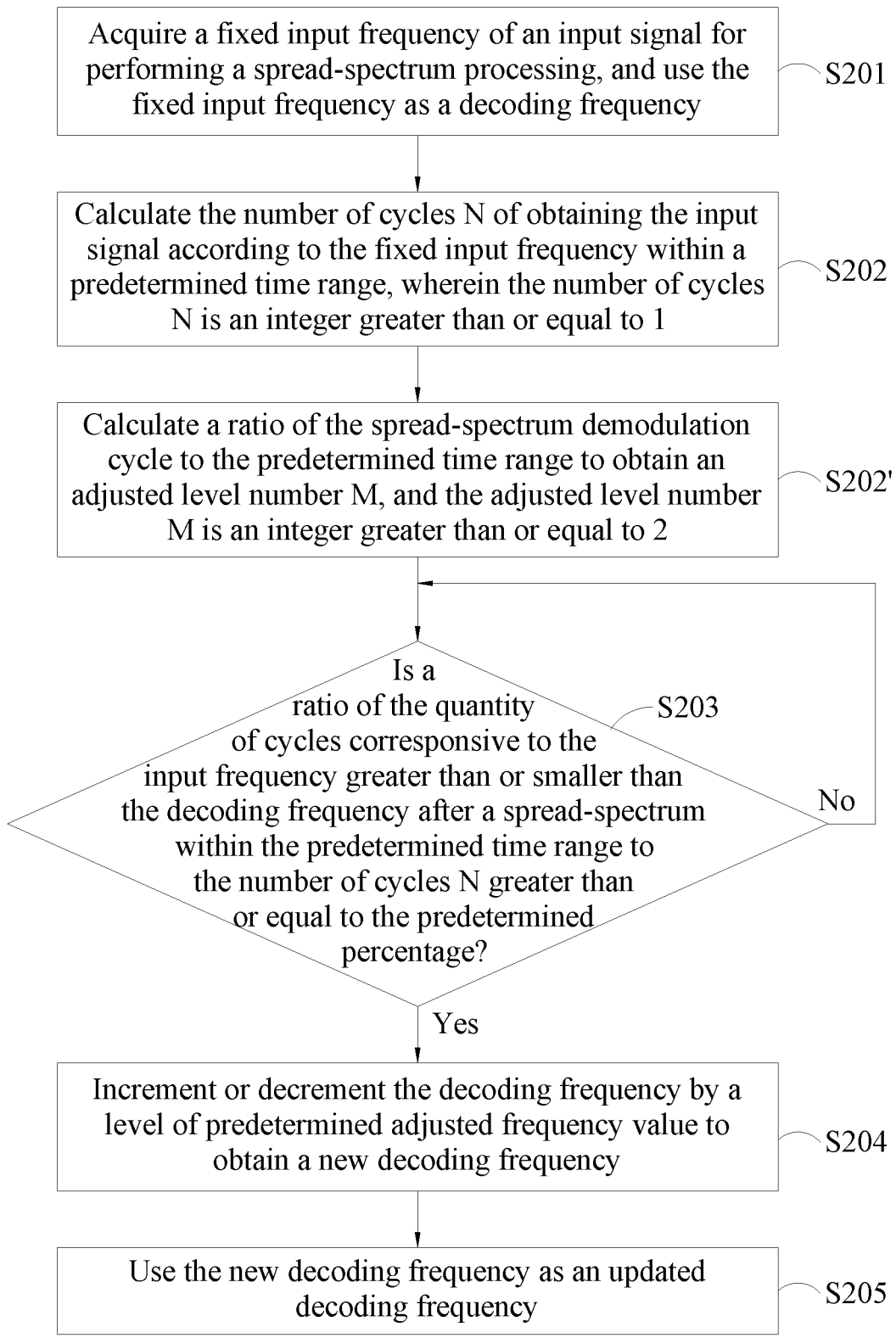
FIG. 3 is a flow chart of a spread-spectrum decoding method for transmitted signal in accordance with another embodiment of the present application.

With reference to FIG. 3 for a flow chart of a spread-spectrum decoding method for transmitted signal in accordance with another embodiment of the present application, the method comprises the following steps:

S201: Acquire a fixed input frequency of an input signal for performing a spread-spectrum processing, and use the fixed input frequency as a decoding frequency.

S202: Calculate the number of cycles N of obtaining the input signal according to the fixed input frequency within a predetermined time range, wherein the number of cycles N is an integer greater than or equal to 1, and each cycle corresponds to the input frequency after the spread-spectrum, and the predetermined time range is smaller than half of the spread-spectrum demodulation cycle, and the spread-spectrum demodulation cycle is a cycle for performing a spread-spectrum processing of the input signal.

S202': Calculate a ratio of the spread-spectrum demodulation cycle to the predetermined time range to obtain an adjusted level number M, and the adjusted level number M is an integer greater than or equal to 2, and each adjusted level corresponds to a level of predetermined adjusted frequency value.

In FIGS. 2a and 2b, when the fixed input frequency of the LVDS signal is 75 MHz, the spread-spectrum demodulation variation frequency is 100 kHz, the spread-spectrum demodulation cycle T is 100 μs, and the predetermined time range t1 is 500 ns, the adjusted level number M can be calculated according to the spread-spectrum demodulation cycle T and the predetermined time range t1, wherein M is equal to 200.

S203: Determine whether or not a ratio of the quantity of cycles corresponsive to the input frequency greater than or smaller than the decoding frequency after a spread-spectrum within the predetermined time range to the number of cycles N is greater than or equal to the predetermined percentage.

S204: Increment or decrement the decoding frequency by a level of predetermined adjusted frequency value to obtain a new decoding frequency, if the ratio of the quantity of cycles corresponsive to the input frequency greater than or smaller than the decoding frequency after a spread-spectrum within the predetermined time range to the number of cycles N is greater than or equal to predetermined percentage.

Figure 4:
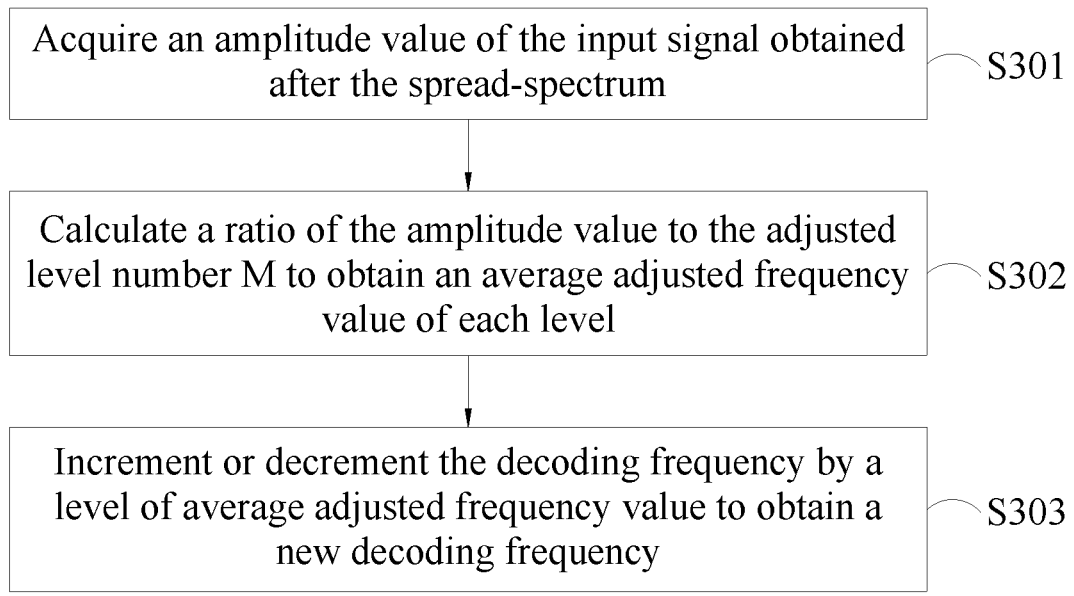
FIG. 4 is a flow chart showing the sub-steps of Step S204 of FIG. 3.

Optionally, the step S204 as shown in FIG. 4 further comprises the following steps:

S301: Acquire an amplitude value of the input signal obtained after the spread-spectrum. When the fixed input frequency of the LVDS signal is 75 MHz, and the spread-spectrum demodulation variation frequency is 100 kHz, and the allowable maximum floating range percentage of the fixed input frequency variation is ±2% (or the variation of the input frequency falls within a range from 73.5 MHz to 76.5 MHz), the amplitude value is 3 MHz.

Figure 5:
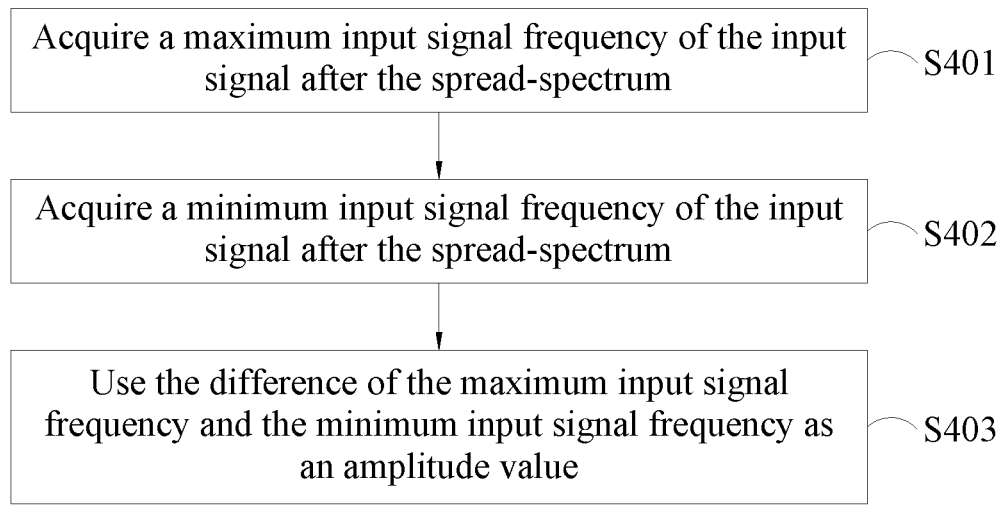
FIG. 5 is a flow chart showing the sub-steps of Step S301 of FIG. 4.

Optionally, the step S301 as shown in FIG. 5 further comprises the following steps:

S401: Acquire a maximum input signal frequency Fmax of the input signal after the spread-spectrum. Wherein, Fmax may be 73.5 MHz.

S402: Acquire a minimum input signal frequency Fmin of the input signal after the spread-spectrum. Wherein, Fmin may be 76.5 MHz.

S403: Use the difference of the maximum input signal frequency and the minimum input signal frequency as an amplitude value. Wherein, the amplitude value may be 3 MHz.

S302: Calculate a ratio of the amplitude value to the adjusted level number M to obtain an average adjusted frequency value of each level.

When the adjusted level number M is 200, every 100 levels correspond to an amplitude value. In other words, each level of average adjusted frequency value is 0.03 MHz.

S303: Increment or decrement the decoding frequency by a level of average adjusted frequency value to obtain a new decoding frequency.

When the average adjusted frequency value is incremented by a level, 0.03 MHz is added to the numerical value of the original decoding frequency; and when the average adjusted frequency value is decremented by a level, 0.03 MHz is subtracted from the numerical value of the original decoding frequency. For example, if the fixed input frequency of the LVDS signal is 75 MHz, the spread-spectrum demodulation variation frequency is 100 kHz, the spread-spectrum demodulation cycle T is 100 μs, the predetermined time range t1 is 500 ns, the original decoding frequency is 75 MHz, and the input frequency of 24 or more cycles in 500 ns after the spread-spectrum will be greater than 75 MHz, so that the obtained new decoding frequency is 75.03 MHz. Similarly, if the original decoding frequency is 75 MHz, and the input frequency of 24 or more cycles in 500 ns after the spread-spectrum will be smaller than 75 MHz, so that the new decoding frequency is 74.97 MHz.

S205: Use the new decoding frequency as an updated decoding frequency.

Wherein, after the new decoding frequency is obtained, it is necessary to update the original decoding frequency. The obtained new decoding frequency is an updated decoding frequency to facilitate continuing the spread-spectrum decoding that follows.

Figure 6:
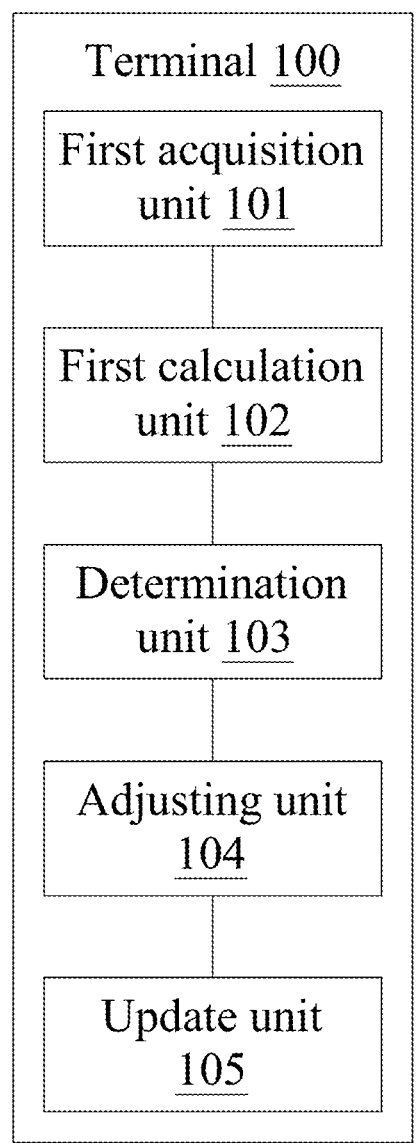
FIG. 6 is a schematic block diagram of a terminal in accordance with the embodiment of the present application.

With reference to FIG. 6 for a schematic block diagram of a terminal in accordance with an embodiment of the embodiment of the present application, the terminal 100 comprises: a first acquisition unit 101 acquiring a fixed input frequency of an input signal for a spread-spectrum processing, and using the fixed input frequency as a decoding frequency.

Wherein, the spread-spectrum function may be carried out to modulate and demodulate the fixed input frequency of the input signal with high speed transmission according to a regular cycle. For example, the low voltage differential signaling (LVDS) used in a TFT liquid crystal display device is generally a high speed transmitted signal. The fixed input frequency of the LVDS signal may be 75 MHz, and the spread-spectrum demodulation variation frequency may be 100 kHz. The larger the spread-spectrum demodulation variation frequency, the higher requirement of the spread-spectrum equipment. At present, the general spread-spectrum demodulation variation frequency has a range up to 200 Hz, or even higher. When the spread-spectrum demodulation variation frequency of the LVDS signal is 100 kHz, the allowable maximum floating range percentage of the fixed input frequency variation may be ±2%. In other words, the input frequency varies within a range from 73.5 MHz to 76.5 MHz.

The first calculation unit 102 is provided for calculating a number of cycles N of acquiring the input signal within a predetermined time range according to the fixed input frequency, wherein the number of cycles N is an integer greater than or equal to 1, and each cycle corresponds to an input frequency after a corresponding spread-spectrum, and the predetermined time range is smaller than half of the spread-spectrum demodulation cycle, and the spread-spectrum demodulation cycle is a cycle for the spread-spectrum processing of the input signal.

Wherein, the cycle of the input signal may be calculated according to a fixed input frequency, so that the number of cycles N of obtaining the input signals within a predetermined time range can be found, and N is an integer greater than or equal to 1. For example, as shown in FIG. 2a, the fixed input frequency of the LVDS signal may be 75 MHz, and the spread-spectrum demodulation variation frequency may be 100 kHz. Since the spread-spectrum demodulation cycle is the cycle for performing a spread-spectrum processing of the input signal, therefore the spread-spectrum demodulation cycle T may be 100p. In FIG. 2b, N input signals of the cycle are included in the predetermined time range t1. In the meantime, the predetermined time range t1 is smaller than half of the spread-spectrum demodulation cycle.

The determination unit 103 is provided for determining whether or not a ratio of the quantity of cycles corresponsive to the input frequency greater than or smaller than the decoding frequency after a spread-spectrum within the predetermined time range to the number of cycles N is greater than or equal to a predetermined percentage.

Wherein, the input signals received after the spread-spectrum in the predetermined time range t1 are of different cycles. If the ratio of the quantity of cycles corresponsive to the input frequency greater than or smaller than the decoding frequency after a spread-spectrum within the predetermined time range to the number of cycles N is greater than or equal to the predetermined percentage, most of the input signals received after the spread-spectrum will be too large. As long as the decoding frequency is increased, the spread-spectrum decoding will be more accurate, and the display noise can be reduced. Similarly, if the ratio of the quantity of cycles corresponsive to the input frequency greater than or smaller than the decoding frequency after a spread-spectrum within the predetermined time range to the number of cycles N is greater than or equal to the predetermined percentage, most of the input signals received after the spread-spectrum will be too small. As long as the decoding frequency is decreased, the spread-spectrum decoding will be more accurate, and the display noise can be reduced. Therefore, it is necessary to compare the decoding frequency with the input frequency received after the spread-spectrum, and further determine the comparison result. Optionally, the predetermined percentage is greater than 50%.

The adjusting unit 104 is provided for incrementing or decrementing the decoding frequency by a level of a predetermined adjusted frequency value to obtain a new decoding frequency, if the ratio of the quantity of cycles corresponsive to the input frequency greater than or smaller than the decoding frequency after a spread-spectrum within the predetermined time range to the number of cycles N is greater than or equal to a predetermined percentage.

Wherein, if the ratio of the quantity of cycles corresponsive to the input frequency greater than or smaller than the decoding frequency after a spread-spectrum within the predetermined time range to the number of cycles N is greater than or equal to a predetermined percentage, then the decoding frequency will be incremented by a level of predetermined adjusted frequency value to obtain a new decoding frequency. Wherein, each predetermined time range t1 corresponds to a predetermined adjusted frequency value, and the predetermined adjusted frequency value of each level is set according to the actual situation.

Specifically, for example, as shown in FIGS. 2a and 2b, when the fixed input frequency of the LVDS signal is 75 MHz, the predetermined time range t1 is 500 ns, and the cycle of the LVDS signal is approximately 13.3 ns, the predetermined time range t1 includes 37.6 cycles which is approximately equal to 40 cycles, which leads to N equals to 40. If the predetermined percentage is 60%, only the input frequency with 24 or more cycles received after the spread-spectrum is greater than the decoding frequency, then the decoding frequency will be incremented by a level of predetermined adjusted frequency value to obtain a new decoding frequency. Similarly, if only the input frequency with 24 or more cycles received after the spread-spectrum is smaller than the decoding frequency, then the decoding frequency will be decremented by a level of predetermined adjusted frequency value to obtain a new decoding frequency.

The update unit 105 is provided for using the new decoding frequency as an updated decoding frequency.

Wherein, after the new decoding frequency is obtained, it is necessary to update the original decoding frequency. The obtained new decoding frequency is the updated decoding frequency and provided for continuing the spread-spectrum decoding that follows, so as to perform the spread-spectrum decoding of the received input signals by the same method, ensure the display effect, and prevent the display noise.

Figure 7:
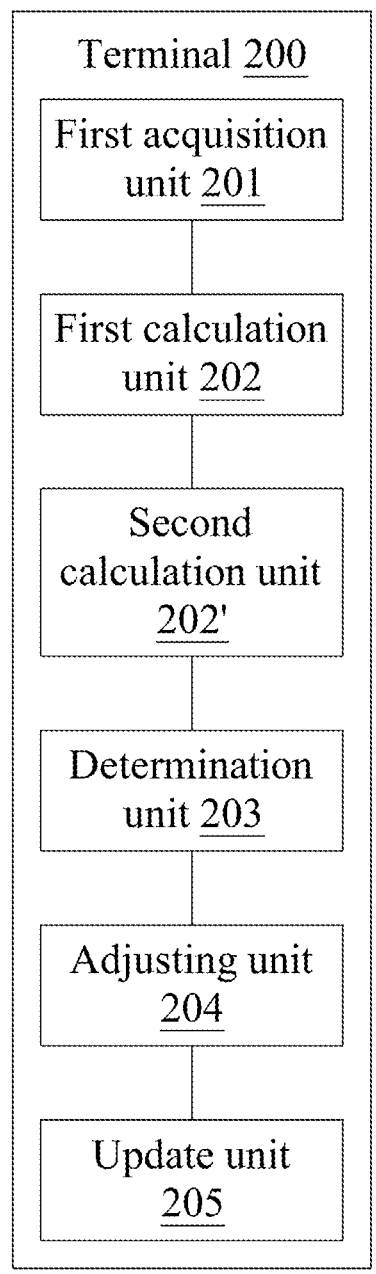
FIG. 7 is a schematic block diagram of a terminal in accordance with the another embodiment of the present application.

With reference to FIG. 7 for a schematic block diagram of a terminal in accordance with another embodiment of the present application, the terminal 200 comprises the following elements:

The first acquisition unit 201 is provided for acquiring a fixed input frequency of an input signal after a spread-spectrum processing, and using the fixed input frequency as a decoding frequency.

The first calculation unit 202 is provided for calculating a number of cycles N of acquiring the input signal within a predetermined time range according to the input frequency, wherein the number of cycles N is an integer greater than or equal to 1, and each cycle corresponds an input frequency after the spread-spectrum, and the predetermined time range is smaller than half of the spread-spectrum demodulation cycle, and the spread-spectrum demodulation cycle is a cycle of performing a spread-spectrum processing of the input signal.

The second calculation unit 20T is provided for calculating a ratio of the spread-spectrum demodulation cycle to the predetermined time range to obtain an adjusted level number M, and the adjusted level number M is an integer greater than or equal to 2, and each adjusted level corresponds to a level of predetermined adjusted frequency value.

In FIGS. 2a and 2b, for example, if the fixed input frequency of the LVDS signal equals to 75 MHz, and the spread-spectrum demodulation variation frequency equals to 100 kHz, and the spread-spectrum demodulation cycle T is 100 μs, and the predetermined time range t1 is 500 ns, and the adjusted level number M can be calculated according to spread-spectrum demodulation cycle T and the predetermined time range t1, which is equal to 200.

The determination unit 203 is provided for determining whether or not a ratio of the quantity of cycles corresponsive to the input frequency greater than or smaller than the decoding frequency after a spread-spectrum within the predetermined time range to the number of cycles N is greater than or equal to a predetermined percentage.

The adjusting unit 204 is provided for incrementing or decrementing the decoding frequency by a level of predetermined adjusted frequency value to obtain a new decoding frequency, if the ratio of the quantity of cycles corresponsive to the input frequency greater than or smaller than the decoding frequency after a spread-spectrum within the predetermined time range to the number of cycles N is greater than or equal to a predetermined percentage, and incrementing or decrementing the decoding frequency by a level of predetermined adjusted frequency value to obtain a new decoding frequency.

Figure 8:
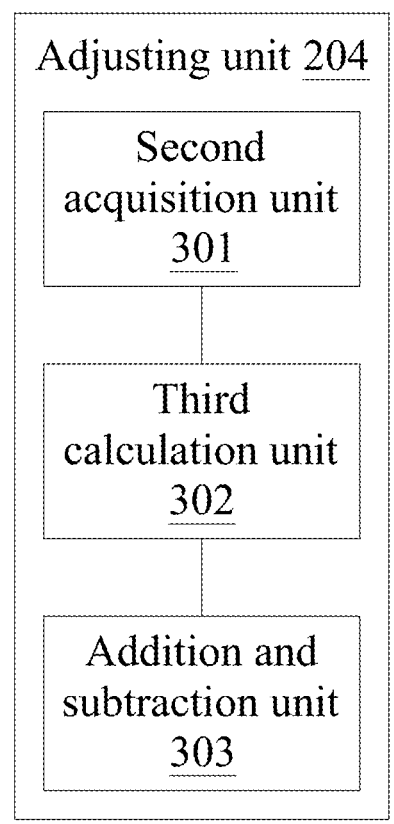
FIG. 8 is a schematic block diagram of a subunit of an adjusting unit of FIG. 7.

Optionally, the adjusting unit 204 as shown in FIG. 8 further comprises the following element:

The second acquisition unit 301 is provided for acquiring the amplitude value of the input signal after the spread-spectrum. For example, when the fixed input frequency of the LVDS signal is 75 MHz, and the spread-spectrum demodulation variation frequency is 100 kHz, the tolerable variable maximum floating range percentage of the fixed input frequency is ±2% (or the input frequency varies within a range from 73.5 MHz to 76.5 MHz), the amplitude value is 3 MHz.

Figure 9:
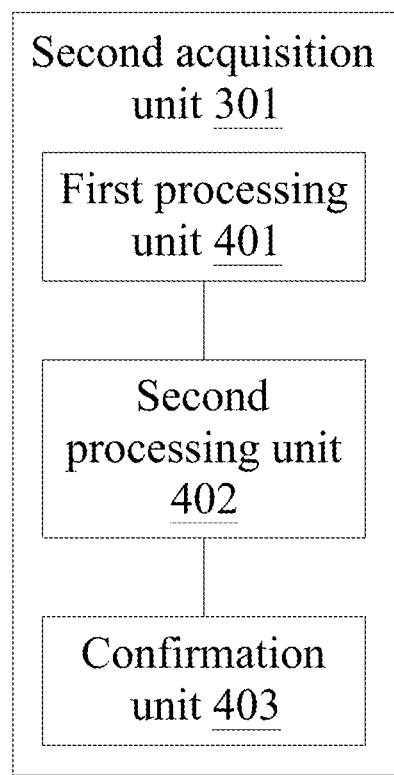
FIG. 9 is a schematic block diagram of a subunit of a second acquisition unit of FIG. 8.

Optionally, the second acquisition unit 301 as shown in FIG. 9 comprises the following elements:

The first processing unit 401 is provided for acquiring a maximum input signal frequency Fmax of the input signal after the spread-spectrum, wherein Fmax may be 73.5 MHz.

The second processing unit 402 is provided for acquiring a minimum input signal frequency Fmin of the input signal after the spread-spectrum, wherein Fmin may be 76.5 MHz.

The confirmation unit 403 is provided for using the difference of the maximum input signal frequency and the minimum input signal frequency as an amplitude value. Wherein, the amplitude value may be 3 MHz.

The third calculation unit 302 is provided for calculating a ratio of the amplitude value to the adjusted level number M to obtain an average adjusted frequency value of each level.

For example, when the adjusted level number M is 200, every 100 levels correspond to an amplitude value, and the average adjusted frequency value of each level is 0.03 MHz.

The addition and subtraction unit 303 is provided for incrementing or decrementing the decoding frequency by a level of average adjusted frequency value to obtain a new decoding frequency.

When the level of the average adjusted frequency value is incremented, 0.03 MHz is added to the numerical value of the original decoding frequency; and when the level of average adjusted frequency value is decremented, 0.03 MHz is subtracted from the numeric value of the original decoding frequency. For example, when the fixed input frequency of the LVDS signal is 75 MHz, the spread-spectrum demodulation variation frequency is 100 kHz, the spread-spectrum demodulation cycle T is 100 μs, and the predetermined time range t1 is 500 ns, and if the original decoding frequency is 75 MHz, and the input frequency of 500 ns has 24 or more cycles greater than 75 MHz after the spread-spectrum, then the new decoding frequency will be 75.03 MHz. Similarly, if the decoding frequency is 75 MHz, and the input frequency of 500 ns has 24 more cycles smaller than 75 MHz after the spread-spectrum, then the new decoding frequency will be 74.97 MHz.

The update unit 205 is provided for using the new decoding frequency as an updated decoding frequency.

After the new decoding frequency is obtained, it is necessary to update the original decoding frequency. The new decoding frequency is the updated decoding frequency and provided for continuing the spread-spectrum decoding that follows.

Figure 10:
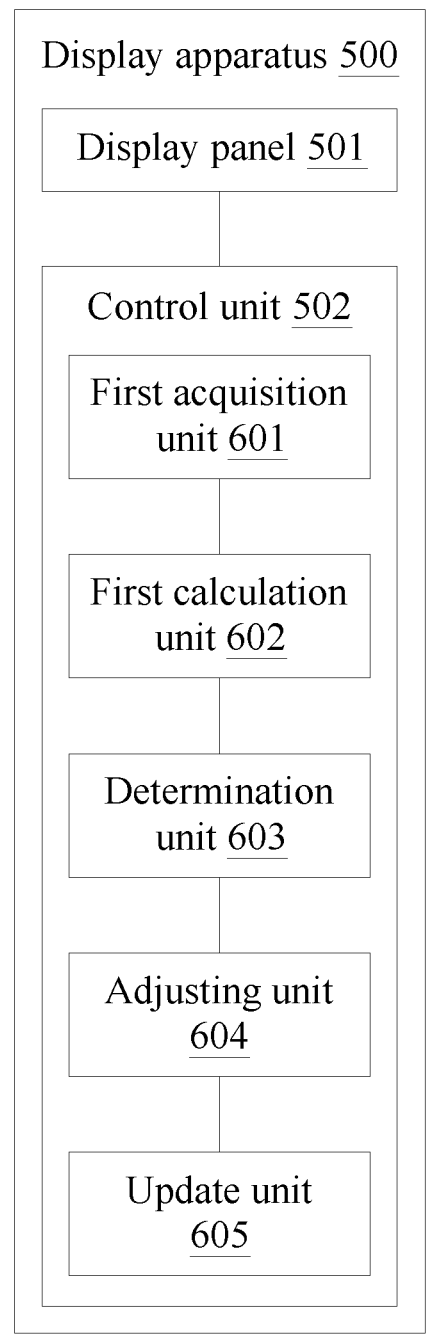
FIG. 10 is a schematic block diagram of a display apparatus in accordance with the embodiment of the present application.

With reference to FIG. 10 for a display apparatus in accordance with an embodiment of the present application, the display apparatus 500 comprises a display panel 501 and a control unit 502. The display apparatus 500 further comprises the following elements:

The first acquisition unit 601 is provided for acquiring a fixed input frequency of an input signal for a spread-spectrum processing, and using the fixed input frequency as a decoding frequency.

The first calculation unit 602 is provided for calculating a number of cycles N of acquiring the input signal within a predetermined time range according to the fixed input frequency, wherein the number of cycles N is an integer greater than or equal to 1, and each cycle corresponds to an input frequency after a corresponding spread-spectrum, and the predetermined time range is smaller than half of the spread-spectrum demodulation cycle, and the spread-spectrum demodulation cycle is a cycle for the spread-spectrum processing of the input signal.

The determination unit 603 is provided for determining whether or not a ratio of the quantity of cycles corresponsive to the input frequency greater than or smaller than the decoding frequency after a spread-spectrum within the predetermined time range to the number of cycles N is greater than or equal to a predetermined percentage.

The adjusting unit 604 is provided for incrementing or decrementing the decoding frequency by a level of predetermined adjusted frequency value to obtain a new decoding frequency, if the ratio of the quantity of cycles corresponsive to the input frequency greater than or smaller than the decoding frequency after a spread-spectrum within the predetermined time range to the number of cycles N is greater than or equal to a predetermined percentage.

The update unit 605 is provided for updating the new decoding frequency as an updated decoding frequency.

Wherein, the display panel 501 may be a liquid crystal display panel, an OLED display panel, a QLED display panel, a curved-surface display panel, or any other type of display panel, which is not limited herein.

Figure 11:
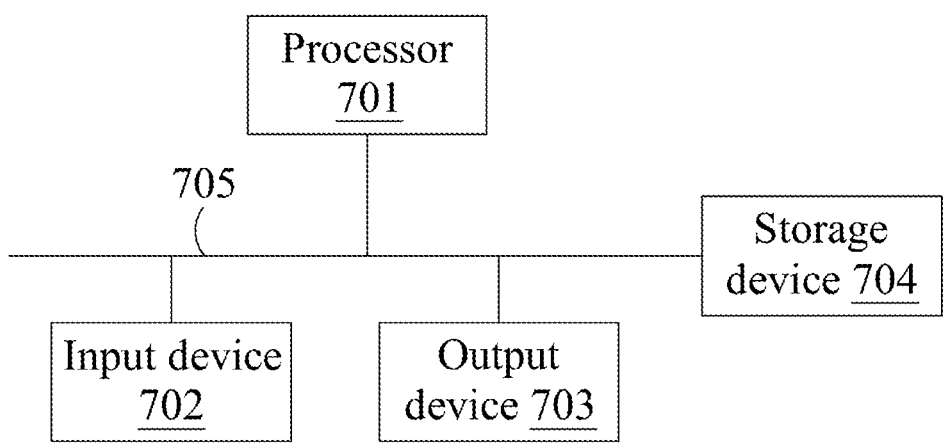
FIG. 11 is a schematic block diagram of a terminal in accordance with the another embodiment of the present application.

With reference to FIG. 11 for a schematic block diagram of a terminal in accordance with another embodiment of the present application, the terminal comprises: one or more processors 701; one or more input devices 702, one or more output devices 703 and a memory 704. The processor 701, input device 702, output device 703 and memory 704 are coupled by a bus 705. The memory 702 is provided for storing an instruction, and the processor 701 is provided for executing the instruction stored in the memory 702.

Wherein, the processor 701 is provided for acquiring a fixed input frequency of an input signal for performing a spread-spectrum processing and using the fixed input frequency as a decoding frequency; calculating a number of cycles N of the input signal within a predetermined time range according to a fixed input frequency, wherein the number of cycles N is an integer greater than or equal to 1; determining whether or not a ratio of the quantity of cycles corresponsive to the input frequency greater than or smaller than the decoding frequency after a spread-spectrum within the predetermined time range to the number of cycles N is greater than or equal to a predetermined percentage; if yes, then incrementing or decrementing the decoding frequency by a level of predetermined adjusted frequency value to obtain a new decoding frequency; updating the new decoding frequency as an updated decoding frequency; and calculating a ratio of the spread-spectrum demodulation cycle to the predetermined time range to obtain an adjusted level number M, wherein the adjusted level number M is an integer greater than or equal to 2, and each adjusted level corresponds a level of predetermined adjusted frequency value.

Further, the processor 701 is specifically provided for acquiring an amplitude value of the input signal after the spread-spectrum; calculating the ratio of the amplitude value to the adjusted level number M to obtain an average adjusted frequency value of each level; and incrementing or decrementing the decoding frequency by a level of the average adjusted frequency value to obtain a new decoding frequency. The processor 701 is further provided for acquiring a maximum input signal frequency of the input signal after the spread-spectrum; acquiring a minimum input signal frequency of the input signal after the spread-spectrum; and using the difference of the maximum input signal frequency and the minimum input signal frequency as an amplitude value.

It is noteworthy that the processor 701 of this embodiment of the present application may be a central processing unit (CPU), or any other universal processor, digital signal processor (DSP), application specific integrated circuit (ASIC), field-programmable gate array (FPGA) or any other programmable logic device, discrete gate or transistor logic device, or discrete hardware component, etc. The universal processor may be a microprocessor or any regular processor.

The input device 702 may comprise a touch panel, a fingerprint sensor (for collecting the information of a user's fingerprint information and fingerprint direction), a microphone, etc, and the output device 703 may be a display device (LCD device), or a speaker.

The memory 704 may include a read only memory and a random access memory, and provide instructions and data to the processor 701. Some of the memories 704 may be a non-volatile random access memory. For example, the memory 704 may be used for storing the information of the type of the equipments.

In an implementation mode of another embodiment of the present application, the processor 701, input device 702, and output device 703 can be used to execute the spread-spectrum decoding method for transmitted signal of the embodiment and the another embodiment of the present application and implement the terminal of the embodiment of the present application.

The terminal in accordance with the other embodiment of the present application includes but not limited to a mobile phone, a laptop computer, a panel PC or any other portable device with a touch sensitive surface (such as a touch display device and/or a touch panel). It should be understood that the device in some of the embodiments may not be a portable communication device, but is a tabletop computer with a touch sensitive surface (such as a touch display device and/or a touch panel).

Persons having ordinary skill in the art should be able to understand that each unit and algorithm disclosed in the above embodiments can be implemented by electronic hardware, computer program, or a combination of the two. To clearly describe the interchangeability of hardware and software, the description above has already described the assembly and procedure of each exemplary embodiment. Whether these functions are carried out by hardware or software depends on specific applications and design conditions of the technical solution. Professional technical people can use each specific application for different method to implement the functions as described in this specification, but all these implementations should not be considered to be beyond the scope of the embodiment of the present application.

For convenience and simplicity, the persons having ordinary skill in the art should clearly understand that the method according to the embodiments of the invention can be referenced for the aforementioned devices including the terminal and unit as well as their operation, and thus they will not be repeated.

In the embodiments of the present application, the disclosed terminal and method may be implemented by other methods. For example, the aforementioned devices described in the embodiment are provided for illustrating the present application, and these units are divided according to a logical function, but the actual implementation may be divided according to other methods. Further, several units or components may be combed or integrated into another system, or some technical characteristics may be ignored or not executed. In addition, the connection, direct connection, or communicative connection can be achieved by some interfaces, and the devices or units may be indirectly or telecommunicatively coupled with each other in form of an electrical connection, a mechanical connection, or any other connection.

The steps as described in the embodiments of the present application method may be adjusted, combined, deleted as needed.

The units in the terminal as described in the embodiments of the present application may be combined, divided, or removed as needed.

The separated parts may or may not be physically separated, and the parts used for display may or may not be a physical unit. In other words, the parts may be disposed at a position or distributed in several network units. A part or the whole of the units may be adopted to implement the embodiments of the present application according to the actual requirements.

In addition, each functional unit as described in each embodiment of the present application may be integrated into a processing unit or existed independently. Two or more units may be integrated into a unit. The aforementioned integrated unit may be implemented by hardware or software.

If the integrated unit is implemented by software and sold or used as a standalone product, the software may be stored in a non-transitory computer readable storage medium. Based on this understanding, the technical solution of the present application may be implemented by a part or the whole of a software product, and the computer software is stored in a storage medium, and a plurality of instructions of the computer software are provided for driving a computer device (such as a personal computer, a server, or a network device, etc) to execute a part of the whole procedure of the method according to each embodiment of the present application. The aforementioned storage medium includes a USB disk, a mobile hard disk, a read only memory (ROM), a random access memory (RAM), a floppy disk or an optical disk, or any medium for storing a program code While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

What is claimed is:

1. A spread-spectrum decoding method for transmitted signal, comprising the steps of:
acquiring a fixed input frequency of an input signal for performing a spread-spectrum processing, and using the fixed input frequency as a decoding frequency;
calculating a number of cycles N of acquiring the input signal within a predetermined time range according to the fixed input frequency, wherein the number of cycles N is an integer greater than or equal to 1, and each cycle corresponds to an input frequency after a corresponding spread-spectrum, and the predetermined time range is smaller than half of a spread-spectrum demodulation cycle, and the spread-spectrum demodulation cycle is a cycle for performing the spread-spectrum processing of the input signal;
determining whether or not a ratio of quantity of cycles corresponsive to the input frequency greater than or smaller than the decoding frequency after the spread-spectrum within the predetermined time range to the number of cycles N is greater than or equal to a predetermined percentage;
incrementing or decrementing the decoding frequency by a level of predetermined adjusted frequency value to obtain a new decoding frequency while the ratio of the quantity of cycles corresponsive to the input frequency greater than or smaller than the decoding frequency after the spread-spectrum within the predetermined time range to the number of cycles N is greater than or equal to the predetermined percentage; and
using the new decoding frequency as an updated decoding frequency.

2. The method according to claim 1, further comprising the step of calculating a ratio of the spread-spectrum demodulation cycle to the predetermined time range to obtain an adjusted level number M which is an integer greater than or equal to 2, and each adjusted level corresponding to the level of predetermined adjusted frequency value.

3. The method according to claim 2, wherein the step of incrementing or decrementing the decoding frequency by the level of the predetermined frequency value to obtain the new decoding frequency specifically executes the steps of:
acquiring an amplitude value of the input signal after the spread-spectrum; calculating a ratio of the amplitude value to the adjusted level number M to obtain an average adjusted frequency value of each level; and
incrementing or decrementing the decoding frequency by the level of the average adjusted frequency value to obtain the new decoding frequency.

4. The method according to claim 3, wherein the step of acquiring the amplitude value of the input signal after the spread-spectrum further comprises the steps of:
acquiring a maximum input signal frequency of the input signal after the spread-spectrum;
acquiring a minimum input signal frequency of the input signal after the spread-spectrum; and
using the difference of the maximum input signal frequency and the minimum input signal frequency as an amplitude value.

5. The method according to claim 1, wherein the predetermined percentage is greater than 50%.

6. The method according to claim 2, wherein the predetermined percentage is greater than 50%.

7. The method according to claim 3, wherein, the predetermined percentage is greater than 50%.

8. A display apparatus, comprising,
a display panel;
a storage unit configured for storing program instructions; and
a processing unit, coupled to the display panel and the storage unit and configured for calling and executing the program instructions to perform the steps of:

acquiring a fixed input frequency of an input signal for performing a spread-spectrum processing, and using the fixed input frequency as a decoding frequency;

calculating a number of cycles N of acquiring the input signal within a predetermined time range according to the fixed input frequency, wherein the number of cycles N is an integer greater than or equal to 1, and each cycle corresponds to an input frequency after a corresponding spread-spectrum, and the predetermined time range is smaller than half of a spread-spectrum demodulation cycle, and the spread-spectrum demodulation cycle is a cycle for performing the spread-spectrum processing of the input signal;

determining whether or not a ratio of quantity of cycles corresponsive to the input frequency greater than or smaller than the decoding frequency after the spread-spectrum within the predetermined time range to the number of cycles N is greater than or equal to a predetermined percentage; and incrementing or decrementing the decoding frequency by a level of predetermined adjusted frequency value to obtain a new decoding frequency while the ratio of the quantity of cycles corresponsive to the input frequency greater than or smaller than the decoding frequency after the spread-spectrum within the predetermined time range to the number of cycles N is greater than or equal to a predetermined percentage;

using the new decoding frequency as an updated decoding frequency.

9. The display apparatus according to claim 8, wherein the processing unit calls and executes the program instructions to perform the step of: calculating a ratio of the spread-spectrum demodulation cycle to the predetermined time range to obtain an adjusted level number M which is an integer greater than or equal to 2, and each adjusted level corresponding to the level of predetermined adjusted frequency value.

10. The display apparatus according to claim 9, wherein the step of incrementing or decrementing the decoding frequency by the level of predetermined frequency value to obtain the new decoding frequency by the processing unit specifically executes the steps of:

acquiring an amplitude value of the input signal after the spread-spectrum;

calculating a ratio of the amplitude value to the adjusted level number M to obtain an average adjusted frequency value of each level; and incrementing or decrementing the decoding frequency by a level of the average adjusted frequency value to obtain a new decoding frequency.

11. The display apparatus according to claim 10, wherein the step of acquiring the amplitude value of the input signal by the processing unit after the spread-spectrum specifically executes the steps of:

acquiring a maximum input signal frequency of the input signal after the spread-spectrum;

acquiring a minimum input signal frequency of the input signal after the spread-spectrum; and using the difference of the maximum input signal frequency and the minimum input signal frequency as an amplitude value.

12. The display apparatus according to claim 8, wherein the predetermined percentage is greater than 50%.

13. The display apparatus according to claim 9, wherein the predetermined percentage is greater than 50%.

14. The display apparatus according to claim 10, wherein the predetermined percentage is greater than 50%.

15. A display apparatus, comprising, a display panel; and a first acquisition unit configured for acquiring a fixed input frequency of an input signal for performing a spread-spectrum processing, and using the fixed input frequency as a decoding frequency;

a first calculation unit configured for calculating a number of cycles N of acquiring the input signal within a predetermined time range according to the fixed input frequency, wherein the number of cycles N is an integer greater than or equal to 1, and each cycle corresponds to an input frequency after a corresponding spread-spectrum, and the predetermined time range is smaller than half of a spread-spectrum demodulation cycle, and the spread-spectrum demodulation cycle is a cycle for performing the spread-spectrum processing of the input signal;

a determination unit configured for determining whether or not a ratio of quantity of cycles corresponsive to the input frequency greater than or smaller than the decoding frequency after the spread-spectrum within the predetermined time range to the number of cycles N is greater than or equal to a predetermined percentage;

an adjusting unit configured for incrementing or decrementing the decoding frequency by a level of predetermined adjusted frequency value to obtain a new decoding frequency while the ratio of the quantity of cycles corresponsive to the input frequency greater than or smaller than the decoding frequency after the spread-spectrum within the predetermined time range to the number of cycles N is greater than or equal to a predetermined percentage; and an update unit configured for updating the new decoding frequency as an updated decoding frequency.

16. The display apparatus according to claim 15, further comprising a second calculation unit configured for calculating a ratio of the spread-spectrum demodulation cycle to the predetermined time range to obtain an adjusted level number M, and the adjusted level number M being an integer greater than or equal to 2, and each adjusted level corresponding to the level of predetermined adjusted frequency value.

17. The display apparatus according to claim 16, wherein the adjusting unit comprises:

a second acquisition unit configured for acquiring an amplitude value of the input signal after the spread-spectrum;

a third calculation unit configured for calculating a ratio of the amplitude value to the adjusted level number M to obtain an average adjusted frequency value of each level; and an addition and subtraction unit configured for incrementing or decrementing the decoding frequency by the level of average adjusted frequency value to obtain a new decoding frequency.

18. The display apparatus according to claim 17, wherein the second acquisition unit comprises:

a first processing unit configured for acquiring a maximum input signal frequency of the input signal after the spread-spectrum;

a second processing unit configured for acquiring a minimum input signal frequency of the input signal after the spread-spectrum; and a confirmation unit configured for using the difference of the maximum input signal frequency and the minimum input signal frequency as an amplitude value.

19. The display apparatus according to claim 15, wherein the predetermined percentage is greater than 50%.

20. The display apparatus according to claim 16, wherein the predetermined percentage is greater than 50%.

\* \* \* \* \*